(12) United States Patent
Nonami et al.

(10) Patent No.: US 12,110,020 B2
(45) Date of Patent: Oct. 8, 2024

(54) BRAKING/DRIVING FORCE CONTROL SYSTEM

(71) Applicant: TOYOTA JIDOSHA KABUSHIKI KAISHA, Toyota (JP)

(72) Inventors: Tomonori Nonami, Toyota (JP); Shin Nomura, Seto (JP); Takeshi Inoguchi, Chiryu (JP); Yoshihide Nakane, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/463,489

(22) Filed: Sep. 8, 2023

(65) Prior Publication Data

US 2023/0415738 A1 Dec. 28, 2023

Related U.S. Application Data

(63) Continuation of application No. 17/899,492, filed on Aug. 30, 2022, now Pat. No. 11,787,403, which is a
(Continued)

(30) Foreign Application Priority Data

Jan. 31, 2019 (JP) ................. 2019-015585

(51) Int. Cl.
  *B60W 30/14* (2006.01)
  *B60W 10/06* (2006.01)
  (Continued)

(52) U.S. Cl.
  CPC .......... *B60W 30/143* (2013.01); *B60W 10/06* (2013.01); *B60W 10/11* (2013.01);
  (Continued)

(58) Field of Classification Search
  CPC .... B60W 30/143; B60W 10/06; B60W 10/11; B60W 10/184; B60W 30/18136; B60W 2520/105; B60W 2720/10
  See application file for complete search history.

(56) References Cited

U.S. PATENT DOCUMENTS 6,104,976 A 8/2000 Nakamura
2003/0098185 A1 5/2003 Komeda
(Continued)

FOREIGN PATENT DOCUMENTS

DE 102018103506 A1 * 8/2018 ............ F02D 37/02
JP 2004-211798 A 7/2004
(Continued)

OTHER PUBLICATIONS

Corrected Notice of Allowability mailed Aug. 25, 2022 in co-pending U.S. Appl. No. 16/725,471, 10 pages.

*Primary Examiner* — Edwin A Young
*Assistant Examiner* — Aimee Tran Nguyen
(74) *Attorney, Agent, or Firm* — Oblon, McClelland, Maier & Neustadt, L.L.P.

(57) ABSTRACT

A braking/driving force control system, during control for maintaining a target vehicle speed, performs fuel cut and then, when a required braking/driving force for maintaining the target vehicle speed reduces, makes a downshift while fuel cut is continued. The braking/driving force control system causes a brake to generate a braking force such that the sum of a braking/driving force that a powertrain generates and the braking force that the brake generates agrees with the required braking/driving force. Thus, good fuel efficiency and riding comfort are obtained.

3 Claims, 4 Drawing Sheets

Related U.S. Application Data continuation of application No. 16/725,471, filed on Dec. 23, 2019, now Pat. No. 11,458,968.

(51) Int. Cl.
*B60W 10/11* (2012.01)
*B60W 10/184* (2012.01)
*B60W 30/18* (2012.01)

(52) U.S. Cl.
CPC .... *B60W 10/184* (2013.01); *B60W 30/18136* (2013.01); *B60W 2520/105* (2013.01); *B60W 2720/10* (2013.01)

(56) References Cited

U.S. PATENT DOCUMENTS

| | | | |
|---|---|---|---|
| 2004/0014565 A1* | 1/2004 | Oshima | F02D 41/123 477/182 |
| 2004/0106497 A1 | 6/2004 | Ayabe | |
| 2006/0080020 A1 | 4/2006 | Iriyama | |
| 2007/0072737 A1* | 3/2007 | Dickinson | F16H 61/143 477/79 |
| 2007/0105689 A1 | 5/2007 | Arai | |
| 2016/0318514 A1 | 11/2016 | Kuwahara | |
| 2017/0113695 A1 | 4/2017 | Kim | |
| 2018/0229734 A1* | 8/2018 | Tsukamoto | F16H 63/502 |
| 2020/0324774 A1 | 10/2020 | Sato | |

FOREIGN PATENT DOCUMENTS

| | | |
|---|---|---|
| JP | 2010276115 A | 12/2010 |
| JP | 2018-132152 | 8/2018 |
| WO | WO 2018/061469 A1 | 4/2018 |

* cited by examiner

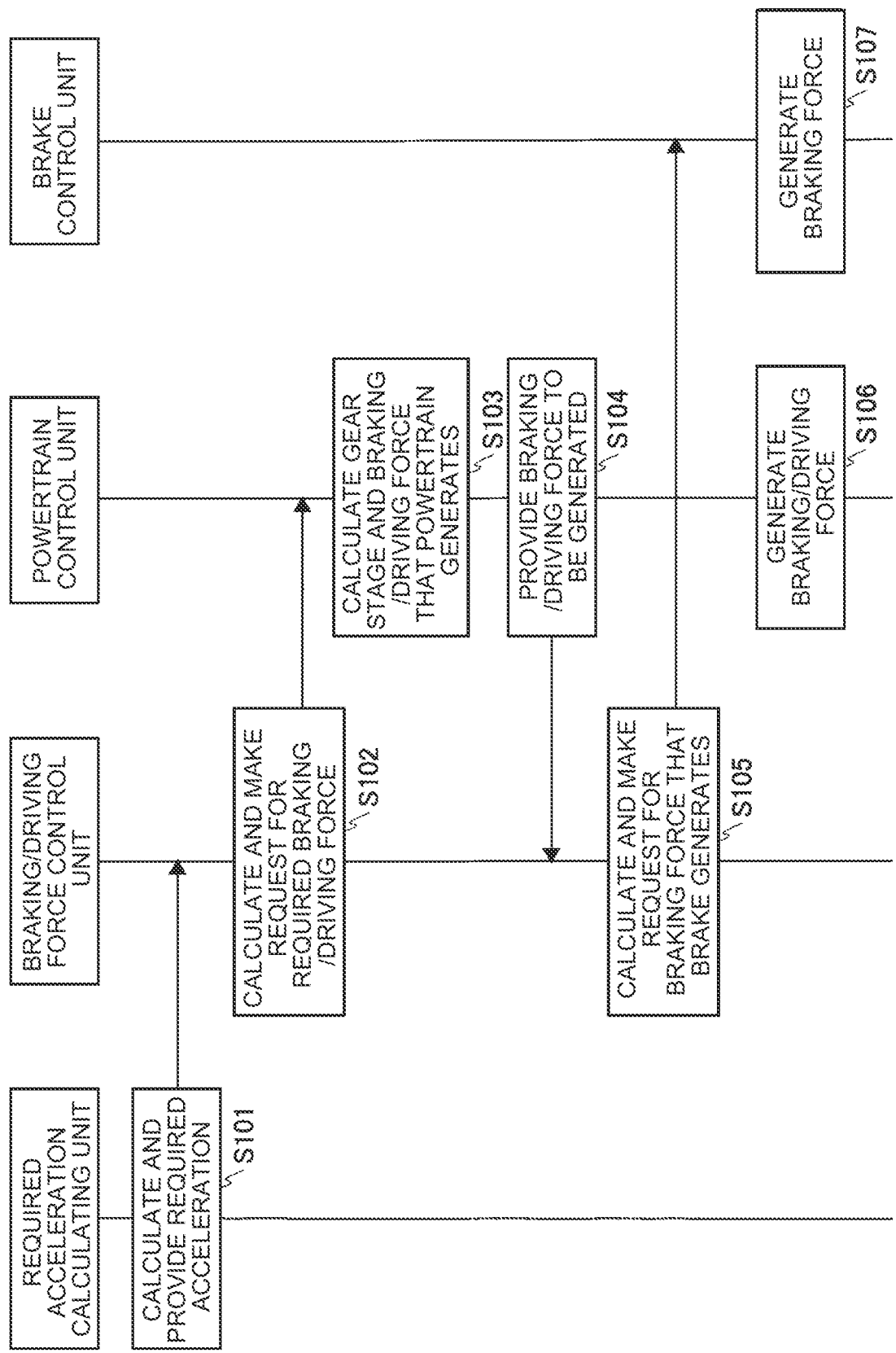

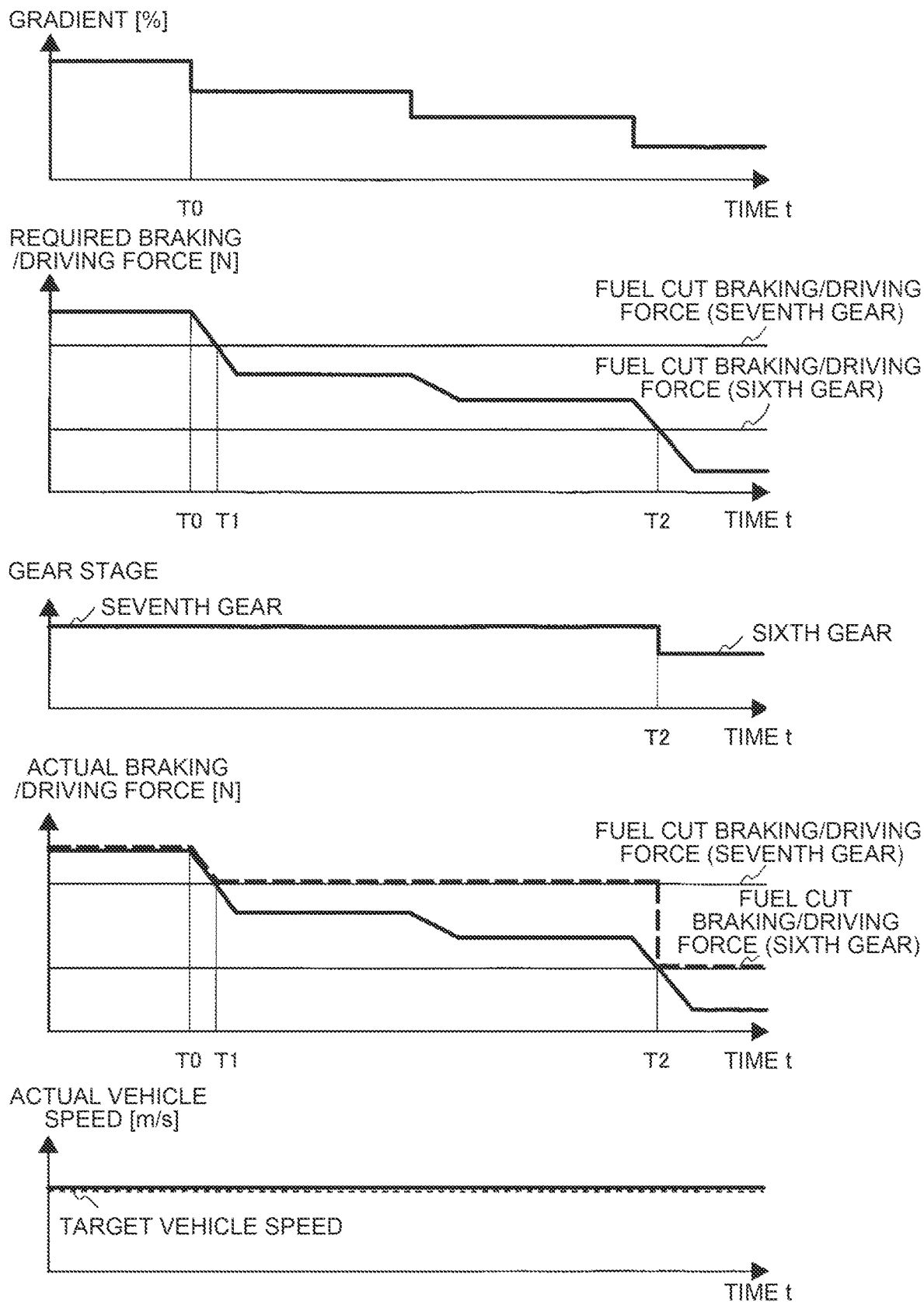

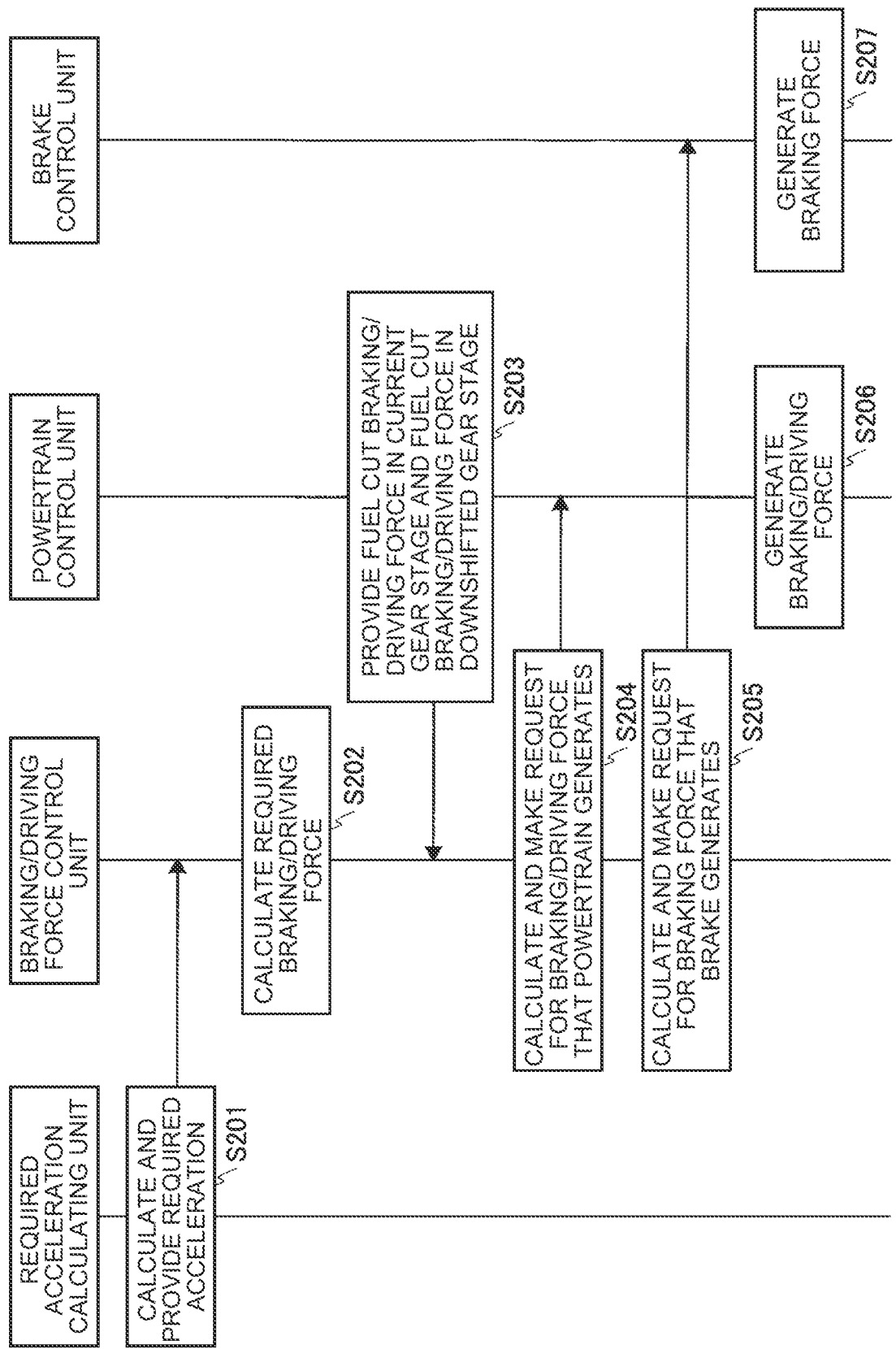

BRAKING/DRIVING FORCE CONTROL SYSTEM

INCORPORATION BY REFERENCE

This application is a continuation of U.S. patent application Ser. No. 17/,99,492, filed Aug. 30, 2022, which is a continuation of U.S. patent application Ser. No. 16/725,471, filed Dec. 23, 2019, which claims the benefit of priority to Japanese Patent Application No. 2019-015585, filed Jan. 31, 2019, the entire contents of each of which are incorporated by reference in their entirety.

BACKGROUND

1. Technical Field

The disclosure relates to a braking/driving force control system that is installed in a vehicle and that controls a braking/driving force of the vehicle.

2. Description of Related Art

Recent vehicles are equipped with a driving assistance system having a function of automatically maintaining a vehicle speed. Examples of such a driving assistance system include an adaptive cruise control (ACC), an adjustable speed limiter (ASL), and a cruise control system (CRC). Such a driving assistance system generates a command for achieving and maintaining a target vehicle speed based on information that is acquired from a camera, a vehicle speed sensor, and other devices, and outputs the command. Based on the command, a powertrain or a brake is controlled, and the powertrain generates a braking/driving force that is a braking force or driving force or the brake generates a braking force. Thus, the target vehicle speed is achieved and maintained.

As a related existing art, for example, Japanese Unexamined Patent Application Publication No. 2004-211798 (JP 2004-211798 A) describes a low-speed traveling system for a vehicle. The low-speed traveling system performs a downshift to increase a driving force when a shortage of driving force has been detected based on the difference between a target vehicle speed and an actual vehicle speed and then upshifts when it is predicted that a downshift is not immediately required again. Thus, the low-speed traveling system reduces a frequent gear change (shift hunting).

SUMMARY

Where a braking/driving force is indicated with the direction of travel of a vehicle set as a positive direction, when a target vehicle speed is maintained, for example, while the vehicle is traveling on a downhill, it is required to generate the effect of engine braking by reducing a braking/driving force to be generated in a powertrain. In such a case, fuel cut is performed in an engine, and a reduction in fuel consumption is expected. However, even when fuel cut is being currently performed, but when a transmission is downshifted to obtain a further large effect of engine braking, fuel cut is cancelled and fuel injection resumes depending on a target vehicle speed in terms of the characteristics of the powertrain. In this way, there is a case where a reduction in fuel consumption is not sufficient. During downshifting, a braking/driving force to be generated can discontinuously change to deteriorate riding comfort. In this way, in powertrain control for maintaining a target vehicle speed, there is room for improvement in fuel efficiency and riding comfort.

The disclosure provides a braking/driving force control system with improved fuel efficiency and riding comfort in control over a braking/driving force to be generated in a vehicle to maintain a target vehicle speed.

An aspect of the disclosure provides a braking/driving force control system that controls a brake and a powertrain including an engine and a stepped transmission to maintain a target vehicle speed. The braking/driving force control system includes a required acceleration calculating unit configured to calculate a required acceleration that is an acceleration that a vehicle generates to maintain the target vehicle speed, a powertrain control unit configured to receive a request to generate a braking/driving force and, based on at least the required braking/driving force, cause the powertrain to generate a braking/driving force by executing control, including whether to perform or cancel fuel cut of the engine and whether to shift a gear stage of the stepped transmission, a brake control unit configured to receive a request to generate a braking force and cause the brake to generate the required braking force, and a braking/driving force control unit configured to, based on the required acceleration, make a request of the powertrain control unit for a braking/driving force and make a request of the brake control unit for a braking force. The powertrain control unit includes a fuel cut braking/driving force calculating unit configured to calculate a fuel cut braking/driving force that is a braking/driving force that the powertrain generates while fuel cut of the engine is being performed in each of a current gear stage of the stepped transmission and a gear stage downshifted from the current gear stage, and a shift control unit configured to receive a request to generate a braking/driving force and, when the required braking/driving force is the fuel cut braking/driving force in the current gear stage, perform fuel cut of the engine while maintaining the gear stage of the stepped transmission in the current gear stage, and, when the required braking/driving force is the fuel cut braking/driving force in the gear stage downshifted from the current gear stage, downshift the gear stage of the stepped transmission and perform fuel cut of the engine. The braking/driving force control unit includes a braking/driving force calculating unit configured to calculate a required braking/driving force that is a conversion of the required acceleration to a force, and a braking/driving force distribution unit configured to make a request of the powertrain control unit for the required braking/driving force, acquire a braking/driving force that the powertrain generates in response to the request, and, when the required braking/driving force is less than the acquired braking/driving force, make a request of the brake control unit for a braking force corresponding to a difference between the required braking/driving force and the acquired braking/driving force.

Another aspect of the disclosure provides a braking/driving force control system that controls a brake and a powertrain including an engine and a stepped transmission to maintain a target vehicle speed. The braking/driving force control system includes a required acceleration calculating unit configured to calculate a required acceleration that is an acceleration that a vehicle generates to maintain the target vehicle speed, a powertrain control unit configured to receive a request to generate a braking/driving force and, based on at least the required braking/driving force, cause the powertrain to generate a braking/driving force by executing control, including whether to perform or cancel fuel cut of the engine and whether to shift a gear stage of the stepped transmission, and a braking/driving force control unit configured to, based on the required acceleration, make a request of the powertrain control unit for a braking/driving force and make a request of the brake control unit for a braking force. The powertrain control unit includes a fuel cut braking/driving force calculating unit configured to calculate a fuel cut braking/driving force that is a braking/driving force that the powertrain generates while fuel cut of the engine is being performed in each of a current gear stage of the stepped transmission and a gear stage downshifted from the current gear stage, and a shift control unit configured to receive a request to generate a braking/driving force and, when the required braking/driving force is the fuel cut braking/driving force in the current gear stage, perform fuel cut of the engine while maintaining the gear stage of the stepped transmission in the current gear stage, and, when the required braking/driving force is the fuel cut braking/driving force in the gear stage downshifted from the current gear stage, downshift the gear stage of the stepped transmission and perform fuel cut of the engine. The braking/driving force control unit includes a braking/driving force calculating unit configured to calculate a required braking/driving force that is a conversion of the required acceleration to a force, and a braking/driving force distribution unit configured to acquire the fuel cut braking/driving force in the current gear stage and the fuel cut braking/driving force in the gear stage downshifted from the current gear stage, when the required braking/driving force is less than or equal to the fuel cut braking/driving force in the current gear stage and is greater than the fuel cut braking/driving force in the gear stage downshifted from the current gear stage, make a request of the powertrain control unit for the fuel cut braking/driving force in the current gear stage and make a request of the brake control unit for a braking force corresponding to a difference between the required braking/driving force and the fuel cut braking/driving force in the current gear stage, and, when the required braking/driving force is less than or equal to the fuel cut braking/driving force in the gear stage downshifted from the current gear stage, make a request of the powertrain control unit for the fuel cut braking/driving force in the gear stage downshifted from the current gear stage and make a request of the brake control unit for a braking force corresponding to a difference between the required braking/driving force and the fuel cut braking/driving force in the gear stage downshifted from the current gear stage.

According to the disclosure, a braking/driving force control system with improved fuel efficiency and riding comfort in control over a braking/driving force that a vehicle generates to maintain a target vehicle speed is provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a sequence diagram that shows a process according to the first embodiment of the disclosure;

FIG. 3 is a timing chart that shows a process according to the first and second embodiments of the disclosure; and FIG. 4 is a sequence diagram that shows a process according to the second embodiment of the disclosure.

DETAILED DESCRIPTION OF EMBODIMENTS

First Embodiment

Figure 1:
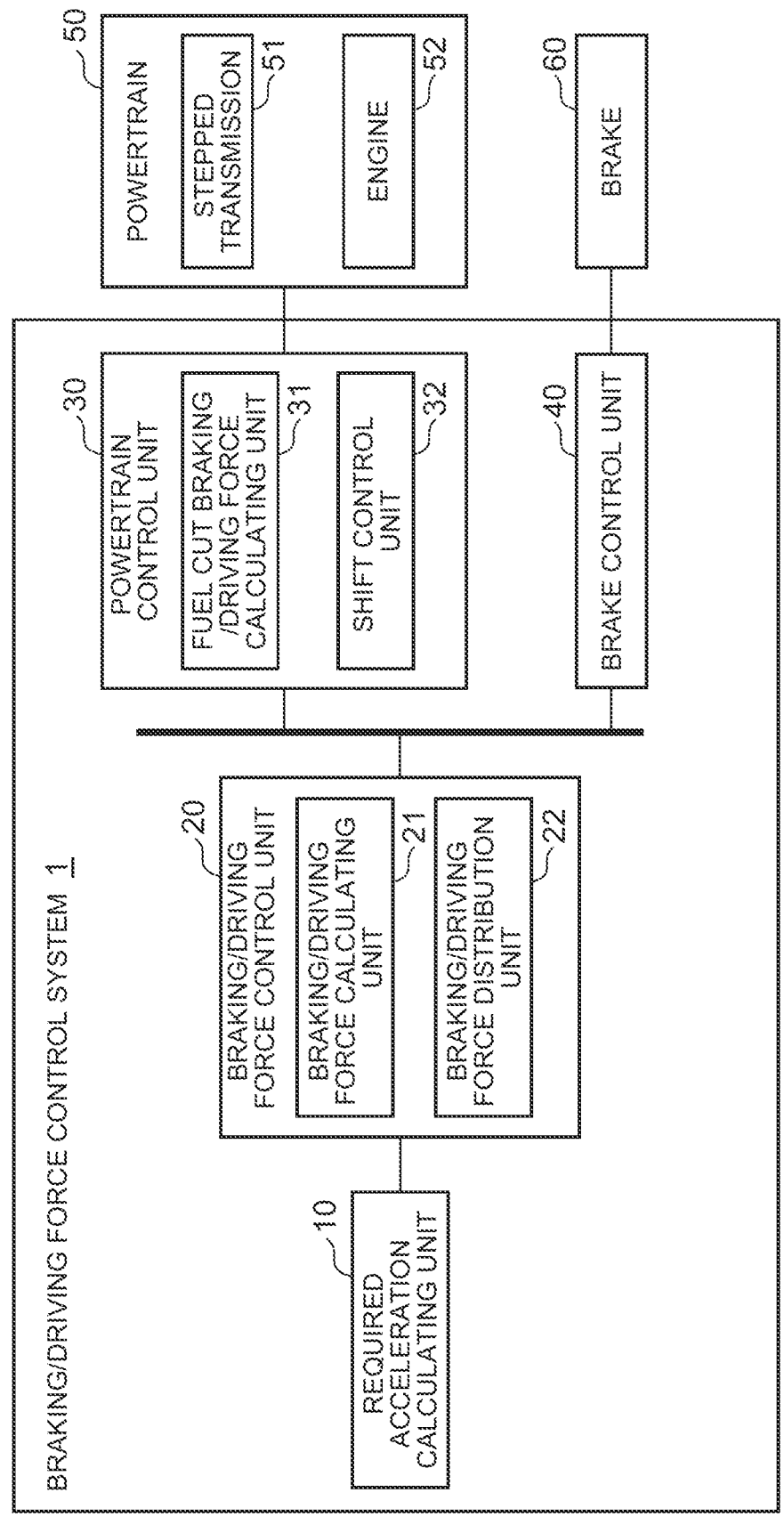
FIG. 1 is a functional block diagram of a braking/driving force control system according to first and second embodiments of the disclosure.

In a braking/driving force control system according to a first embodiment of the disclosure, during control for maintaining a target vehicle speed, fuel cut is performed and then, when a required braking/driving force for maintaining the target vehicle speed reduces, a downshift is performed while fuel cut is continued. Thus, fuel consumption is reduced. In addition, while fuel cut is being performed, a brake generates a braking force such that the sum of a braking/driving force that a powertrain generates and the braking force that the brake generates agrees with a required braking/driving force. Therefore, a discontinuous change in braking/driving force that the powertrain generates during a downshift has no influence on riding comfort, so good riding comfort is obtained. Hereinafter, the present embodiment will be described in detail with reference to the accompanying drawings.

Configuration

FIG. 1 is a functional block diagram of the braking/driving force control system 1 according to the present embodiment and its peripheral devices. The braking/driving force control system 1 includes a required acceleration calculating unit 10, a braking/driving force control unit 20, a powertrain control unit 30, and a brake control unit 40. The powertrain control unit 30 controls a powertrain 50. The brake control unit 40 controls a brake 60.

The required acceleration calculating unit 10 is provided in a driving assistance system having a function of achieving and maintaining a target vehicle speed of ACC, or the like. The required acceleration calculating unit 10 sets a target vehicle speed based on information indicating statuses of a vehicle and surroundings of the vehicle, to be acquired from a vehicle speed sensor, a camera, and other devices, and preset information, and calculates a required acceleration that is an acceleration that the vehicle generates as control information for achieving and maintaining the target vehicle speed.

The braking/driving force control unit 20 includes a braking/driving force calculating unit 21 and a braking/driving force distribution unit 22. The braking/driving force calculating unit 21 receives the above-described required acceleration as a request from the required acceleration calculating unit 10, and calculates a required braking/driving force by converting the require acceleration to a force that the vehicle generates. A required braking/driving force is expressed by, for example, a value with the direction of travel of the vehicle being set as a positive direction. A required braking/driving force can be calculated based on, for example, a required acceleration and a preset weight of the vehicle. In calculation, a computation, such as feedback based on an actual speed of the vehicle, acquired from the vehicle speed sensor or another device and correction based on an inclination of a road surface or other information, acquired from various sensors, may be performed. Based on a required braking/driving force, the braking/driving force distribution unit 22 makes a request of the powertrain control unit 30 for a braking/driving force that is a braking force or a driving force and, where necessary, further makes a request of the brake control unit 40 for a braking force.

The powertrain control unit 30 is able to generate a braking/driving force by controlling the powertrain 50. The powertrain 50 includes a stepped transmission 51 and an engine 52. When the powertrain control unit 30 generates a braking force, the powertrain control unit 30 is able to perform fuel cut of the engine 52 according to the value of the braking force and various statuses of the powertrain 50, such as the temperature of the engine 52 and the gear stage of the stepped transmission 51.

The powertrain control unit 30 includes a fuel cut braking/driving force calculating unit 31 and a shift control unit 32. The fuel cut braking/driving force calculating unit 31 monitors various statuses of the powertrain 50, and, based on the various statuses of the powertrain 50, calculates a fuel cut braking/driving force that is a braking/driving force that the powertrain 50 generates while fuel cut of the engine 52 is being performed in each of a current gear stage of the stepped transmission 51 and a gear stage downshifted from the current gear stage. The shift control unit 32 determines details of control over the powertrain 50, such as whether to change the gear stage of the stepped transmission 51 and whether to perform fuel cut of the engine 52, according to the required braking/driving force.

The brake control unit 40 is able to generate a braking force by controlling the brake 60 of the vehicle.

Process

FIG. 2 is a sequence diagram that shows an example of a braking/driving force control process that the braking/driving force control system 1 executes. An example of the braking/driving force control process will be described with reference to FIG. 2. The sequence shown in FIG. 2 is repeatedly executed when the vehicle travels on, for example, a downhill and a braking/driving force that the vehicle generates to maintain a target vehicle speed gradually reduces during execution of a driving assistance function, such as ACC.

Step S101

The required acceleration calculating unit 10 calculates a required acceleration as described above. The required acceleration calculating unit 10 provides the required acceleration to the braking/driving force control unit 20.

Step S102

The braking/driving force calculating unit 21 of the braking/driving force control unit 20 receives the required acceleration provided in step S101, and calculates a required braking/driving force as described above based on the required acceleration. The braking/driving force distribution unit 22 of the braking/driving force control unit 20 makes a request of the powertrain control unit 30 to generate the required braking/driving force.

Step S103

The powertrain control unit 30 receives the required braking/driving force required in step S102. The fuel cut braking/driving force calculating unit 31 of the powertrain control unit 30 calculates a fuel cut braking/driving force in the current gear stage of the stepped transmission 51 and a fuel cut braking/driving force in the gear stage downshifted from the current gear stage. Generally, a fuel cut braking/driving force in a gear stage downshifted from a current gear stage is less (greater in braking force) than a fuel cut braking/driving force in the current gear stage.

The shift control unit 32 of the powertrain control unit 30 executes the following control based on the required braking/driving force.

(1-1) When Required Braking/Driving Force Is Greater than Fuel Cut Braking/Driving Force in Current Gear Stage The shift control unit 32 does not perform fuel cut of the engine 52 while the gear stage of the stepped transmission 51 is maintained in the current gear stage. The shift control unit 32 causes the powertrain 50 to generate the required braking/driving force.

In terms of the characteristics of the powertrain 50, when a required braking/driving force is slightly greater than a fuel cut braking/driving force in a current gear stage, there is a case that a braking/driving force just equal to the required braking/driving force cannot be generated. In other words, when there is a difference between a minimum braking/driving force that can be generated without performing fuel cut in the current gear stage and a fuel cut braking/driving force in the current gear stage and a required braking/driving force is less than the minimum braking/driving force that can be generated without performing fuel cut and greater than the fuel cut braking/driving force, there is a case that a braking/driving force just equal to the required braking/driving force cannot be generated even when fuel cut is performed or not performed in the current gear stage. In such a case, for example, the shift control unit 32 may generate a minimum braking/driving force that can be generated without performing fuel cut in the current gear stage (alternative process to 1-1) instead of causing the powertrain 50 to generate a required braking/driving force.

(1-2) When Required Braking/Driving Force Is Less than or Equal to Fuel Cut Braking/Driving Force in Current Gear Stage and Greater than Fuel Cut Braking/Driving Force in Downshifted Gear Stage The shift control unit 32 performs fuel cut of the engine 52 while the gear stage of the stepped transmission 51 is maintained in a current gear stage. Thus, the shift control unit 32 causes the powertrain 50 to generate a fuel cut braking/driving force in the current gear stage.

(1-3) When Required Braking/Driving Force Is Less than or Equal to Fuel Cut Braking/Driving Force in Downshifted Gear Stage The shift control unit 32 downshifts the gear stage of the stepped transmission 51 and performs fuel cut of the engine 52. Thus, the shift control unit 32 causes the powertrain 50 to generate a fuel cut braking/driving force in the downshifted gear stage. If there is an error in a calculated value of fuel cut braking/driving force in the downshifted gear stage, there is a possibility that fuel cut cannot be performed or cancelled when the powertrain 50 is caused to generate the calculated fuel cut braking/driving force. Therefore, this process may be executed when a required braking/driving force is less than a value obtained by subtracting a predetermined positive value from a fuel cut braking/driving force in a downshifted gear stage; otherwise, the process of (1-2) may be executed. Thus, when a downshift has been performed, a fuel cut state can be further reliably achieved.

As described above, a braking/driving force that the powertrain 50 generates is equal to a required braking/driving force or greater than the required braking/driving force. In other words, when a braking force is required as a required braking/driving force, a braking force that the powertrain 50 generates can be insufficient for the required braking/driving force.

Step S104

The shift control unit 32 of the powertrain control unit 30 provides the braking/driving force control unit 20 with the braking/driving force that the powertrain 50 generates, determined in step S103.

Step S105

The braking/driving force distribution unit 22 of the braking/driving force control unit 20 determines a braking force that the brake 60 generates as follows based on the required braking/driving force and the braking/driving force that the powertrain 50 generates, provided in step S104.

(1-4) When Required Braking/Driving Force Is Less than Braking/Driving Force that Powertrain 50 Generates The braking/driving force distribution unit 22 makes a request of the brake control unit 40 for a braking force corresponding to a difference between the required braking/driving force and the braking/driving force that the powertrain 50 generates. In other words, when a braking force is required because the required braking/driving force is small and the required braking/driving force cannot be generated only by the powertrain 50, the brake 60 operates to compensate for a shortage of braking force.

(1-5) When Required Braking/Driving Force Is Equal to Braking/Driving Force that Powertrain 50 Generates The braking/driving force distribution unit 22 does not make a request of the brake control unit 40 for a braking force. Alternatively, the braking/driving force distribution unit 22 makes a request of the brake control unit 40 for zero (N) as a braking force.

The powertrain control unit 30 may acquire the range of braking force that the brake 60 can currently generate, from the brake control unit 40 and determine a braking force to be required of the brake control unit 40 within the acquired range. For example, in the above-described (1-4) case, when the absolute value of a braking force corresponding to a difference between the required braking/driving force and the braking/driving force that the powertrain 50 generates exceeds the maximum value of the absolute value of a braking force that the brake 60 can currently generate, the braking/driving force distribution unit 22 may make a request of the brake control unit 40 for a braking force corresponding to the maximum value.

Step S106

The powertrain control unit 30 causes the powertrain 50 to generate the braking/driving force determined in step S103.

Step S107

When the brake control unit 40 is required from the braking/driving force control unit 20 in step S105 to generate a braking force, the brake control unit 40 causes the brake 60 to generate the required braking force.

The above-described process of step S101 to step S107 is repeatedly executed. An example of braking/driving force control through the above-described process will be described with reference to FIG. 3. In FIG. 3, the abscissa axes represent time, and the ordinate axes respectively represent a gradient of a road on which the vehicle is traveling, a required braking/driving force, a gear stage of the stepped transmission 51, an actual braking/driving force, and an actual vehicle speed. For actual braking/driving force, the wide dashed line represents an actual braking/driving force that the powertrain 50 is generating, and the wide solid line represents the sum of an actual braking/driving force that the powertrain 50 is generating and an actual braking force that the brake 60 is generating.

In the example shown in FIG. 3, at time T0, the road on which the vehicle is traveling becomes a downhill, after that, the gradient indicated where an uphill is represented by a positive value gradually reduces (a downhill slope increases), and a required braking/driving force for achieving a target vehicle speed gradually reduces. At time T0, the gear stage of the stepped transmission 51 is seventh gear as an example. At time T1, the required braking/driving force is equal to a fuel cut braking/driving force in the case where the gear stage is seventh gear. After that, at time T2, the required braking/driving force is equal to a fuel cut braking/driving force in the case where the gear stage is sixth gear. FIG. 3 collectively shows examples of fuel cut braking/driving force and target vehicle speed in each of the gear stages (seventh gear and sixth gear). FIG. 3 shows the fuel cut braking/driving forces and the target vehicle speed with constant values as an example. Actually, the fuel cut braking/driving forces and the target vehicle speed fluctuate depending on the operation of the driving assistance system and the statuses of the powertrain 50. Even when the fuel cut braking/driving forces and the target vehicle speed fluctuate, a similar process is possible.

The period during which time t satisfies t<T1 corresponds to the above-described (1-1) and (1-5). The shift control unit 32 does not perform fuel cut of the engine 52 while the gear stage of the stepped transmission 51 is maintained in the current gear stage (seventh gear). The shift control unit 32 causes the powertrain 50 to generate a required braking/driving force. The brake control unit 40 does not cause the brake 60 to generate a braking force.

When there is a difference between a minimum braking/driving force that can be generated without performing fuel cut and a fuel cut braking/driving force in the current gear stage, after the required braking/driving force becomes less than the minimum braking/driving force that can be generated without performing fuel cut, the above-described (alternative process to 1-1) and (1-4) may be executed. The shift control unit 32 does not perform fuel cut of the engine 52 while the gear stage of the stepped transmission 51 is maintained in the current gear stage (seventh gear). The shift control unit 32 causes the powertrain 50 to generate the minimum braking/driving force that can be generated without performing fuel cut in the current gear stage (seventh gear). The brake control unit 40 causes the brake 60 to generate a braking force corresponding to a difference between the required braking/driving force and the minimum braking/driving force.

The time at which time t satisfies t=T1 corresponds to the above-described (1-2) and (1-5). The shift control unit 32 performs fuel cut of the engine 52 while maintaining the gear stage of the stepped transmission 51 in the current gear stage (seventh gear). Thus, the shift control unit 32 causes the powertrain 50 to generate the fuel cut braking/driving force in the current gear stage (seventh gear). The brake control unit 40 does not cause the brake 60 to generate a braking force.

The period during which time t satisfies T1<t<T2 corresponds to the above-described (1-2) and (1-4). The shift control unit 32 performs fuel cut of the engine 52 while maintaining the gear stage of the stepped transmission 51 in the current gear stage (seventh gear). Thus, the shift control unit 32 causes the powertrain 50 to generate the fuel cut braking/driving force in the current gear stage (seventh gear). The brake control unit 40 causes the brake 60 to generate a braking force corresponding to a difference between the required braking/driving force and the fuel cut braking/driving force in the current gear stage (seventh gear).

The time at which time t satisfies t=T2 corresponds to the above-described (1-3) and (1-5). The shift control unit 32 downshifts the gear stage (seventh gear) of the stepped transmission 51 into sixth gear and performs fuel cut of the engine 52. Thus, the shift control unit 32 causes the powertrain 50 to generate the fuel cut braking/driving force in the downshifted gear stage (sixth gear). The brake control unit 40 does not cause the brake 60 to generate a braking force.

The period during which time t satisfies T2<t corresponds to the above-described (1-1) and (1-4) while the required braking/driving force is greater than a fuel cut braking/driving force in a gear stage (fifth gear) downshifted from the current gear stage (sixth gear). The shift control unit 32 performs fuel cut of the engine 52 while maintaining the gear stage of the stepped transmission 51 in the current gear stage (sixth gear). Thus, the shift control unit 32 causes the powertrain 50 to generate the fuel cut braking/driving force in the current gear stage (sixth gear). The brake control unit 40 causes the brake 60 to generate a braking force corresponding to a difference between the required braking/driving force and the fuel cut braking/driving force in the current gear stage.

After that, as the required braking/driving force gradually reduces, a downshift is repeated while fuel cut is continued. For example, when the required braking/driving force becomes less than or equal to the fuel cut braking/driving force in the gear stage (fifth gear) downshifted from the current gear stage (sixth gear), the shift control unit 32 downshifts the gear stage (sixth gear) of the stepped transmission 51 into fifth gear and performs fuel cut of the engine 52. The brake 60 generates a braking force as needed such that an actual braking/driving force that is the sum of the fuel cut braking/driving force that the powertrain 50 generates and the braking force of the brake 60 agrees with the required braking/driving force.

As long as the powertrain control unit 30 is configured to be able to calculate a fuel cut braking/driving force in a gear stage downshifted in two or more multiple stages from a current gear stage, when a required braking/driving force has steeply reduced, be able to continue fuel cut, and be able to cause the brake 60 to generate a braking force such that an actual braking/driving force that is the sum of the fuel cut braking/driving force that the powertrain 50 generates and the braking force of the brake 60 agrees with the required braking/driving force, the powertrain control unit 30 may downshift the stepped transmission 51 in two or more multiple stages. When the required braking/driving force has changed to increase because of, for example, a change in the gradient of a road on which the vehicle is traveling, an upshift may be performed while fuel cut is similarly continued or fuel cut may be cancelled as needed according to the value of required braking/driving force and the output characteristics of the powertrain 50. A determination as to whether to execute control in a manner such that a downshift is performed only when fuel cut can be continued, as in the case of the present embodiment, may be performed by the braking/driving force distribution unit 22 of the braking/driving force control unit 20 based on predetermined conditions, such as an instruction from the driving assistance system, a fuel consumption reduction mode designated by a user, a detected value of required acceleration and its reduction tendency, and a detected reduction tendency of a road gradient that can be acquired from sensors of the vehicle, and an instruction to reduce a cancellation of fuel cut may be provided to the powertrain control unit 30 based on the determined result. Alternatively, this determination may be performed by the powertrain control unit 30 based on, for example, the value of required braking/driving force and its reduction tendency.

Second Embodiment

In the braking/driving force control system 1 according to the first embodiment, the powertrain control unit 30 determines a braking/driving force to be generated by the powertrain 50. In contrast to this, the braking/driving force control system according to a second embodiment of the disclosure has a similar configuration to that of the first embodiment, but differs from that of the first embodiment in that the braking/driving force control unit 20 determines a braking/driving force that the powertrain 50 generates.

Process

FIG. 4 is a sequence diagram that shows an example of a braking/driving force control process that the braking/driving force control system 1 executes. An example of the braking/driving force control process will be described with reference to FIG. 4. The description of similar matters to those of the first embodiment is omitted or simplified.

Step S201

The required acceleration calculating unit 10 calculates a required acceleration and provides the required acceleration to the braking/driving force control unit 20.

Step S202

The braking/driving force calculating unit 21 of the braking/driving force control unit 20 calculates a required braking/driving force based on the required acceleration.

Step S203

The fuel cut braking/driving force calculating unit 31 of the powertrain control unit 30 calculates a fuel cut braking/driving force in the current gear stage of the stepped transmission 51 and a fuel cut braking/driving force in the gear stage downshifted from the current gear stage, and provides the fuel cut braking/driving forces to the braking/driving force control unit 20. The process of this step is a process that is, for example, periodically executed in the powertrain control unit 30. The braking/driving force control unit 20 is able to acquire a fuel cut braking/driving force in a current gear stage and a fuel cut braking/driving force in a gear stage downshifted from the current gear stage at any time.

Step S204

The braking/driving force distribution unit 22 of the braking/driving force control unit 20 determines as follows a braking/driving force that the powertrain 50 generates based on the required braking/driving force calculated in step S202 and the fuel cut braking/driving force in the current gear stage and the fuel cut braking/driving force in the gear stage downshifted from the current gear stage, both provided in step S203, and makes a request of the powertrain control unit 30 for the braking/driving force that the powertrain 50 generates.

(2-1) When Required Braking/Driving Force Is Greater than Fuel Cut Braking/Driving Force in Current Gear Stage The braking/driving force distribution unit 22 makes a request of the powertrain control unit 30 for the required braking/driving force.

When there is a difference between a minimum braking/driving force that can be generated by the powertrain 50 without performing fuel cut in the current gear stage and the fuel cut braking/driving force in the current gear stage, the process is executed as follows in step S203. In step S203, the fuel cut braking/driving force calculating unit 31 may calculate a minimum braking/driving force that can be generated without performing fuel cut and provide the minimum braking/driving force to the braking/driving force control unit 20, and, when the required braking/driving force is less than the minimum braking/driving force that can be generated without performing fuel cut and greater than the fuel cut braking/driving force, the braking/driving force distribution unit 22 may make a request of the powertrain control unit 30 for the minimum braking/driving force that can be generated without fuel cut (alternative process to 2-1) instead of making a request for the required braking/driving force.

(2-2) When Required Braking/Driving Force Is Less than or Equal to Fuel Cut Braking/Driving Force in Current Gear Stage and Greater than Fuel Cut Braking/Driving Force in Gear Stage Downshifted from Current Gear Stage The braking/driving force distribution unit 22 makes a request of the powertrain control unit 30 for the fuel cut braking/driving force in the current gear stage.

(2-3) When Required Braking/Driving Force Is Less than or Equal to Fuel Cut Braking/Driving Force in Gear Stage Downshifted from Current Gear Stage The braking/driving force distribution unit 22 makes a request of the powertrain control unit 30 for the fuel cut braking/driving force in the gear stage downshifted from the current gear stage.

Step S205

The braking/driving force distribution unit 22 of the braking/driving force control unit 20 determines as follows a braking force that the brake 60 generates based on the required braking/driving force calculated in step S202 and the fuel cut braking/driving force in the current gear stage and the fuel cut braking/driving force in the gear stage downshifted from the current gear stage, both provided in step S203. When the braking/driving force distribution unit 22 causes the brake 60 to generate a braking force, the braking/driving force distribution unit 22 makes a request of the brake control unit 40 for the determined braking force.

(2-4) When Required Braking/Driving Force Is Greater than Fuel Cut Braking/Driving Force in Current Gear Stage The braking/driving force distribution unit 22 does not make a request of the brake control unit 40 for a braking force. Alternatively, the braking/driving force distribution unit 22 makes a request of the brake control unit 40 for zero (N) as a braking force.

However, when the braking/driving force distribution unit 22 has made a request of the powertrain control unit 30 for the minimum braking/driving force that can be generated without performing fuel cut through the above-described (alternative process to 2-1) instead of making a request of the powertrain control unit 30 for the required braking/driving force, the braking/driving force distribution unit 22 makes a request of the brake control unit 40 for a braking force corresponding to a difference between the required braking/driving force and the minimum braking/driving force that can be generated without performing fuel cut.

(2-5) When Required Braking/Driving Force Is Less than or Equal to Fuel Cut Braking/Driving Force in Current Gear Stage and Greater than Fuel Cut Braking/Driving Force in Gear Stage Downshifted from Current Gear Stage The braking/driving force distribution unit 22 makes a request of the brake control unit 40 for the braking force corresponding to the difference between the required braking/driving force and the fuel cut braking/driving force in the current gear stage.

(2-6) When Required Braking/Driving Force Is Less than or Equal to Fuel Cut Braking/Driving Force in Gear Stage Downshifted from Current Gear Stage The braking/driving force distribution unit 22 makes a request of the brake control unit 40 for the braking force corresponding to the difference between the required braking/driving force and the fuel cut braking/driving force in the gear stage downshifted from the current gear stage.

Step S206

The powertrain control unit 30 causes the powertrain 50 to generate the braking/driving force required in step S204. When the required braking/driving force is greater than the fuel cut braking/driving force in the current gear stage, the powertrain control unit 30 eventually causes the powertrain 50 to generate the required braking/driving force without performing fuel cut in the current gear stage. When the required braking/driving force is the fuel cut braking/driving force in the current gear stage, the powertrain control unit 30 eventually causes the powertrain 50 to generate the fuel cut braking/driving force in the current gear stage while causing the powertrain 50 to perform fuel cut in the current gear stage. When the required braking/driving force is the fuel cut braking/driving force in the downshifted gear stage, the powertrain control unit 30 eventually causes the powertrain 50 to downshift and perform fuel cut and causes the powertrain 50 to generate the fuel cut braking/driving force in the downshifted gear stage.

Step S207

When the brake control unit 40 is required from the braking/driving force control unit 20 in step S205 to generate a braking force, the brake control unit 40 causes the brake 60 to generate the required braking force.

The above-described process of step S201 to step S207 is repeatedly executed. The result of braking/driving force control through the above process is similar to that of the first embodiment. To illustrate this, an example of braking/driving force control through the process of the present embodiment will be described with reference to FIG. 3.

The period during which time t satisfies t<T1 corresponds to the above-described (2-1) and (2-4). The shift control unit 32 does not perform fuel cut of the engine 52 while the gear stage of the stepped transmission 51 is maintained in the current gear stage (seventh gear). The shift control unit 32 causes the powertrain 50 to generate a required braking/driving force. The brake control unit 40 does not cause the brake 60 to generate a braking force.

When there is a difference between a minimum braking/driving force that can be generated without performing fuel cut and a fuel cut braking/driving force in the current gear stage, after the required braking/driving force becomes less than the minimum braking/driving force that can be generated without performing fuel cut, the above-described (alternative process to 2-1) and (2-4) may be executed. In this case, the shift control unit 32 does not perform fuel cut of the engine 52 while the gear stage of the stepped transmission 51 is maintained in the current gear stage (seventh gear). The shift control unit 32 causes the powertrain 50 to generate the minimum braking/driving force that can be generated by the powertrain 50, and the brake control unit 40 causes the brake 60 to generate a braking force corresponding to a difference between the required braking/driving force and the minimum braking/driving force that can be generated without performing fuel cut.

The time at which time t satisfies t=T1 corresponds to the above-described (2-2) and (2-5). The shift control unit 32 performs fuel cut of the engine 52 while maintaining the gear stage of the stepped transmission 51 in the current gear stage (seventh gear). Thus, the shift control unit 32 causes the powertrain 50 to generate the fuel cut braking/driving force in the current gear stage (seventh gear). Since the braking force corresponding to the difference between the required braking/driving force and the fuel cut braking/driving force in the current gear stage (seventh gear) is zero (N), the brake control unit 40 does not cause the brake 60 to generate a braking force.

The period during which time t satisfies T1<t<T2 corresponds to the above-described (2-2) and (2-5). The shift control unit 32 performs fuel cut of the engine 52 while maintaining the gear stage of the stepped transmission 51 in the current gear stage (seventh gear). Thus, the shift control unit 32 causes the powertrain 50 to generate the fuel cut braking/driving force in the current gear stage (seventh gear). The brake control unit 40 causes the brake 60 to generate a braking force corresponding to a difference between the required braking/driving force and the fuel cut braking/driving force in the current gear stage (seventh gear).

The time at which time t satisfies t=T2 corresponds to the above-described (2-3) and (2-6). The shift control unit 32 downshifts the gear stage (seventh gear) of the stepped transmission 51 into sixth gear and performs fuel cut of the engine 52. Thus, the shift control unit 32 causes the powertrain 50 to generate the fuel cut braking/driving force in the downshifted gear stage (sixth gear). The brake control unit 40 causes the brake 60 to generate a braking force corresponding to a difference between the required braking/driving force and the fuel cut braking/driving force in the downshifted gear stage (sixth gear). Since the braking force corresponding to the difference between the required braking/driving force and the fuel cut braking/driving force in the downshifted gear stage (sixth gear) is zero (N), the brake control unit 40 does not cause the brake 60 to generate a braking force.

The period during which time t satisfies T2<t corresponds to the above-described (2-2) and (2-5) while the required braking/driving force is greater than the fuel cut braking/driving force in a gear stage (fifth gear) downshifted from the current gear stage (sixth gear). The shift control unit 32 performs fuel cut of the engine 52 while maintaining the gear stage of the stepped transmission 51 in the current gear stage (sixth gear). Thus, the shift control unit 32 causes the powertrain 50 to generate the fuel cut braking/driving force in the current gear stage (sixth gear). The brake control unit 40 causes the brake 60 to generate a braking force corresponding to a difference between the required braking/driving force and the fuel cut braking/driving force in the current gear stage (sixth gear).

After that, as the required braking/driving force gradually reduces, a downshift is repeated while fuel cut is continued. For example, when the required braking/driving force becomes less than or equal to the fuel cut braking/driving force in the gear stage (fifth gear) downshifted from the current gear stage (sixth gear), the shift control unit 32 downshifts the gear stage (sixth gear) of the stepped transmission 51 into fifth gear and performs fuel cut of the engine 52. The brake 60 generates a braking force as needed such that an actual braking/driving force that is the sum of the fuel cut braking/driving force that the powertrain 50 generates and the braking force of the brake 60 agrees with the required braking/driving force.

As described above, a similar process to that of the first embodiment is executed in the present embodiment. As long as the powertrain control unit 30 is configured to be able to calculate a fuel cut braking/driving force in a gear stage downshifted in two or more multiple stages from a current gear stage and provide the fuel cut braking/driving force to the braking/driving force control unit 20 and the braking/driving force control unit 20 is configured to be able to, when a required braking/driving force has steeply reduced, continue fuel cut and be able to cause the brake 60 to generate a braking force such that an actual braking/driving force that is the sum of the fuel cut braking/driving force that the powertrain 50 generates and the braking force of the brake 60 agrees with the required braking/driving force, the braking/driving force control unit 20 may make a request of the powertrain control unit 30 for the fuel cut braking/ driving force in the gear stage of the stepped transmission 51, downshifted in two or more stages. When the required braking/driving force has changed to increase because of, for example, a change in the gradient of a road on which the vehicle is traveling, an upshift may be performed while fuel cut is similarly continued or fuel cut may be cancelled as needed according to the value of required braking/driving force and the output characteristics of the powertrain 50.

Advantageous Effects

According to the embodiments of the disclosure, fuel cut of the engine 52 is performed during control for maintaining a target vehicle speed, and then, as a required braking/driving force for maintaining the target vehicle speed reduces, a downshift is performed while fuel cut is continued. Therefore, a reduction of fuel consumption is continued.

The brake 60 generates a braking force such that the sum of a braking/driving force that the powertrain 50 generates during fuel cut and the braking force that the brake 60 generates agrees with a required braking/driving force. Therefore, there is no influence of a discontinuous change in braking/driving force that the powertrain 50 generates during a downshift on riding comfort, so good riding comfort is obtained. In addition, a braking/driving force that the vehicle generates suitably agrees with a required braking/driving force, so good trackability of a target vehicle speed is obtained.

When the above-described (alternative process to 1-1) or (alternative process to 2-1) is executed, even when there is a discontinuous change in braking/driving force that the powertrain 50 generates in transition from a state where fuel cut is not performed to a state where fuel cut is performed, the brake 60 generates a braking force such that the sum of the braking/driving force that the powertrain 50 generates and the braking force that the brake 60 generates agrees with the required braking/driving force. Therefore, further good riding comfort and trackability of a target vehicle speed are obtained.

The embodiments of the disclosure are described above; however, the disclosure may be interpreted as not only a braking/driving force control system but also a control method or control program that various units of the braking/driving force control system or computers of the various units execute, a non-transitory computer readable recording medium storing the control program, or a vehicle, or the like, equipped with the braking/driving force control system.

The disclosure is useful for a braking/driving force control system equipped for a vehicle, or the like.

What is claimed is:

1. A control device that controls a powertrain including an engine and a stepped transmission, the control device comprising:
a fuel cut braking/driving force calculating unit configured to, in a current gear stage of the stepped transmission and a gear stage downshifted from the current gear stage, calculate a first fuel cut braking/driving force corresponding to the current gear stage and a second fuel cut braking/driving force corresponding to the gear stage downshifted from the current gear stage, that are braking/driving forces that the powertrain generates while fuel cut of the engine is performed; and
a shift control unit configured to set a set gear stage of the stepped transmission and perform the fuel cut of the engine in the set gear stage based on a relationship of a required braking/driving force, the first fuel cut braking/driving force, and the second fuel cut braking/driving force.

2. A method that is performed by a control device that controls a powertrain including an engine and a stepped transmission, the method comprising:

calculating, in a current gear stage of the stepped transmission and a gear stage downshifted from the current gear stage, a first fuel cut braking/driving force corresponding to the current gear stage and a second fuel cut braking/driving force corresponding to the gear stage downshifted from the current gear stage, that are braking/driving forces that the powertrain generates while fuel cut of the engine is performed, and setting a set gear stage of the stepped transmission and performing the fuel cut of the engine in the set gear stage based on a relationship of a required braking/driving force, the first fuel cut braking/driving force, and the second fuel cut braking/driving force.

3. A non-transitory storage medium storing instructions that are executable by one or more processors and that cause the one or more processors to perform functions comprising:

calculating, in a current gear stage of a stepped transmission and a gear stage downshifted from the current gear stage, a first fuel cut braking/driving force corresponding to the current gear stage and a second fuel cut braking/driving force corresponding to the gear stage downshifted from the current gear stage, that are braking/driving forces that a powertrain generates while fuel cut of an engine is performed, and setting a set gear stage of the stepped transmission and performing the fuel cut of the engine in the set gear stage based on a relationship of a required braking/driving force, the first fuel cut braking/driving force, and the second fuel cut braking/driving force.

* * * * *